United States Patent [19]

Pace et al.

[11] 3,792,435
[45] Feb. 12, 1974

[54] AUTOMOBILE THEFT PREVENTION ALARM SYSTEM

[76] Inventors: Casper Pace, 141 Rodney Ave., Buffalo, N.Y. 14214; Thomas D. Pace, 1721 N. Cliff St., Alexandria, Va. 22301

[22] Filed: May 30, 1972

[21] Appl. No.: 257,688

[52] U.S. Cl. ............... 340/63, 307/10 AT, 180/114
[51] Int. Cl. ........................................... B60r 25/10
[58] Field of Search...... 340/63, 64, 65; 307/10 AT; 180/114

[56] References Cited
UNITED STATES PATENTS

| 2,935,730 | 5/1960 | Procter | 340/63 |
|---|---|---|---|
| 2,839,736 | 6/1958 | Tinsley et al. | 340/63 |
| 2,892,181 | 6/1959 | Benson et al. | 340/64 |
| 3,074,049 | 1/1963 | Saliba et al. | 340/63 X |
| 2,687,518 | 8/1954 | Helman | 340/63 |
| 3,699,515 | 10/1972 | Barnett | 340/65 |

*Primary Examiner*—Alvin H. Waring
*Attorney, Agent, or Firm*—Andrew R. Basile; Irving M. Weiner; Arnold S. Weintraub

[57] ABSTRACT

An automobile theft prevention alarm system having an externally mounted control switch operated by the automobile operator to activate the alarm system. The alarm system comprises a central relay connected in series to the automobile battery by the control switch and is adapted to be activated by any of a plurality of sensing switches strategically located throughout the automobile. The relay is, in turn, connected to one or more warning devices, such as the automobile lights and horn, and when activated by one of the sensing switches, such as by the unauthorized opening of a car door or hood, the resulting electrical connection through the relay activates the warning devices. Once the relay has been energized, the subsequent closing of a sensing switch will not deactivate the warning system. In one embodiment of the invention a time delay mechanism is employed to terminate the alarm system after a predetermined period of operation provided the sensing switches are open, that is provided the associated portion of the automobile is returned to a normal authorized position.

7 Claims, 5 Drawing Figures

PATENTED FEB 12 1974 3,792,435

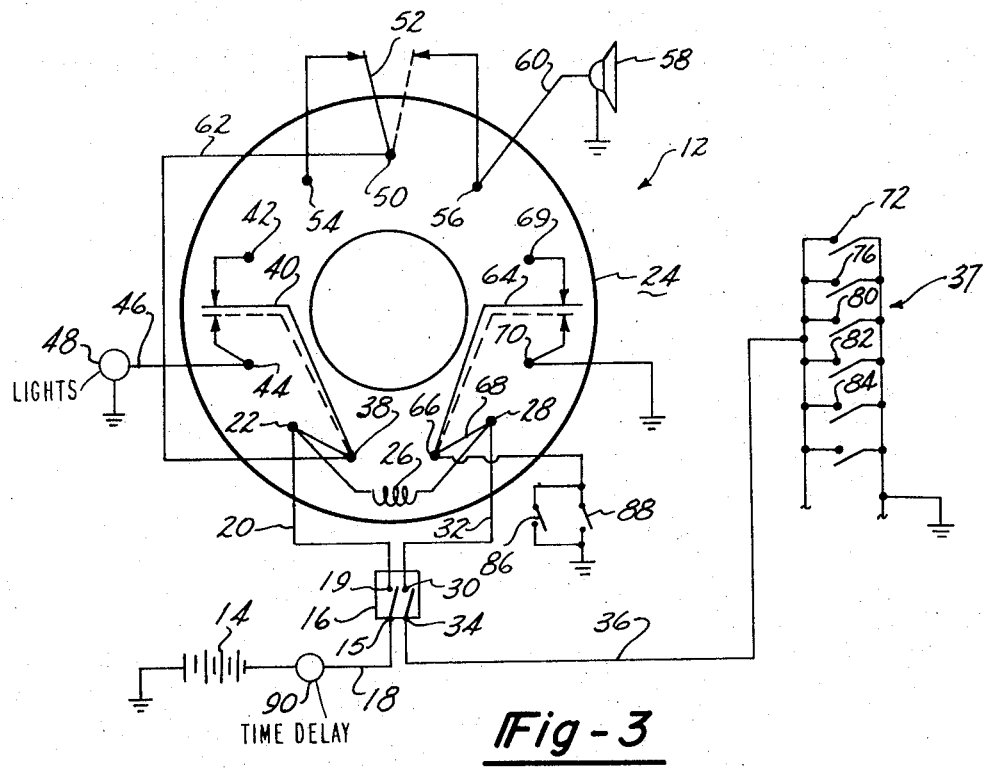
Fig-3
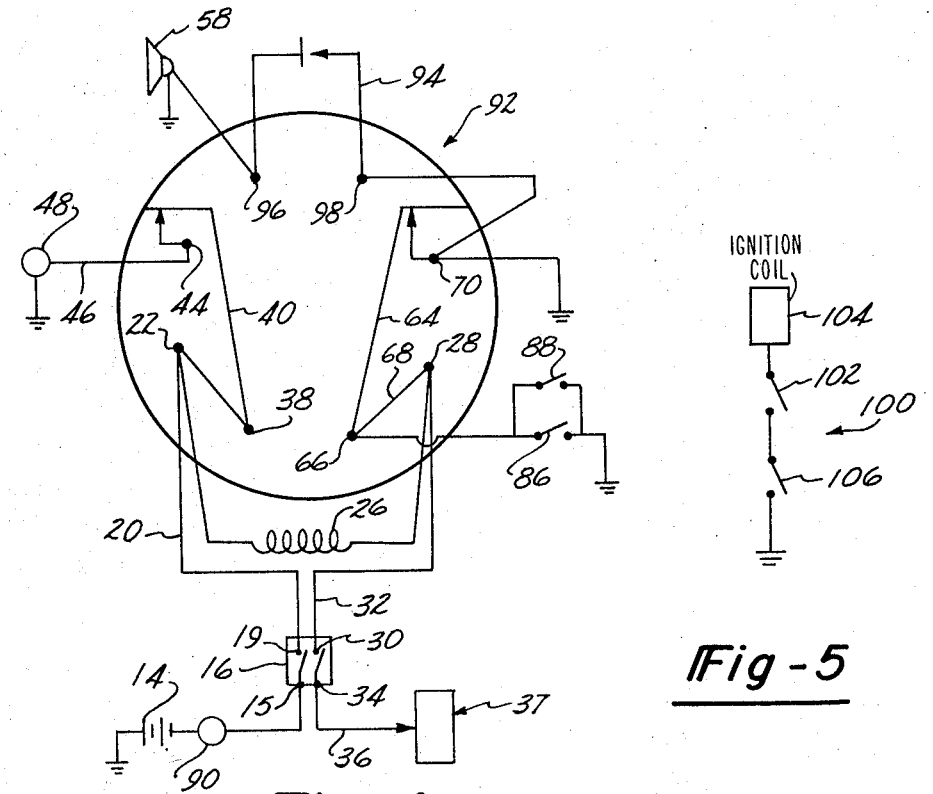
Fig-4
Fig-5

AUTOMOBILE THEFT PREVENTION ALARM SYSTEM

BACKGROUND OF THE INVENTION

1. Field of the Invention

The present invention relates to alarm systems, and particularly, to an alarm system for use on vehicles such as automobiles to indicate the unauthorized entry into, the use of the vehicle or the removal of components therefrom.

2. Description of the Prior Art

The theft of automobiles and of the components of automobiles such as tires, radios and other property represents one of the more significant areas of criminal activity and as the use and expense of autombiles increases, so does the incidents of thefts involving automobiles and property therein. The provision of an alarm which would be actuated upon the unauthorized opening of a car door of the automobile, or the operation of any electrically controlled device in the automobile has constituted an effective deterrent against thefts of the type as the sound of a wailing siren or horn is almost certain to cause a would-be car thief to abandon his plans as well as quickly attract the attention of the police and others including the automobile owner.

Alarms of this type have been proposed and are in wide-spread use in trucks carrying large quantities of goods often having considerable value and examples of such alarms are disclosed in the following U.S. Pat. Nos.: 2,650,354; 2,687,518; 2,935,730; 3,422,398; 3,513,466; 3,548,373; and 3,593,273. The acceptance and use of such warning devices by owners of automobiles has, however, been greatly limited, largely as a result of the high initial purchase cost for an effective alarm system and the difficulty of installation. The known alarm systems, such as those disclosed in the aforementioned Letters Patents, which may be adapted for use in automobiles have further drawbacks in that they are complicated in their design and are unreliable. Further, when the alarm is effective to deter the thief, the alarm continues to remain activated and may well drain the automobile battery before the owner arrives and terminates the system, all of which may leave the owner stranded with a dead battery resulting in additional inconvenience and expense.

SUMMARY OF THE INVENTION

The present invention, which will be described subsequently in greater detail, comprises an automobile theft prevention alarm system having as a source of power the automobile battery which is electrically connected to a central relay by an externally mounted operator actuated control switch. The relay which connects the battery to any one of a plurality of warning devices is actuated by sensing switches that become operable upon the unauthorized entry or use of the automobile.

It is therefore a primary object of the present invention to provide an automobile theft prevention alarm system which is operatively connected to the battery circuit of the automobile by means of a central relay which is actuated in response to the actuation of any one of a plurality of sensing switches strategically located through the automobile when an externally mounted control switch is first positioned in an operative mode.

It is also an object of the present invention to provide an automobile theft prevention alarm system which, when activated by the unauthorized use of the automobile, will prevent the operation of the automobile engine.

It is still another obejct of the present invention to provide an automobile theft prevention alarm system which is reliable in that it is effective to deter a would-be thief, but one which will not drain an automobile battery after being actuated as a result of the unauthorized use or entry into the automobile.

It is still a further object of the present invention to provide an automobile theft prevention alarm system which makes use of conventionally available components, which is inexpensive to manufacture and readily and inexpensively installed in an automobile at any automobile service station.

Other objects, advantages and applications of the present invention will become apparent to those skilled in the art of automobile theft prevention alarm systems when the accompanying description of several modes of the preferred embodiments of the present invention is read in conjunction with the accompanying drawings.

BRIEF DESCRIPTION OF THE DRAWINGS

The description herein makes reference to the accompanying drawings wherein like reference numerals refer to like components throughout the several views, and in which:

FIG. 3 is a schematic circuit diagram of a preferred embodiment of the present invention;

FIG. 4 is a schematic circuit diagram of a modification of the present invention; and FIG. 5 is a schematic circuit diagram of another modification of the present invention.

DESCRIPTION OF THE PREFERRED EMBODIMENTS

Figure 1:
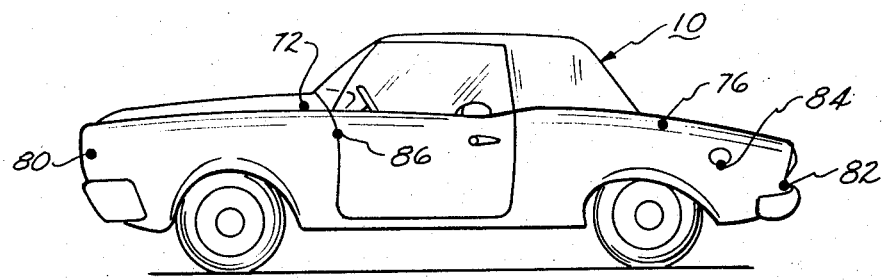
FIG. 1 is a side elevational view of an automobile having incorporated therein an example of the present invention.
Figure 2:
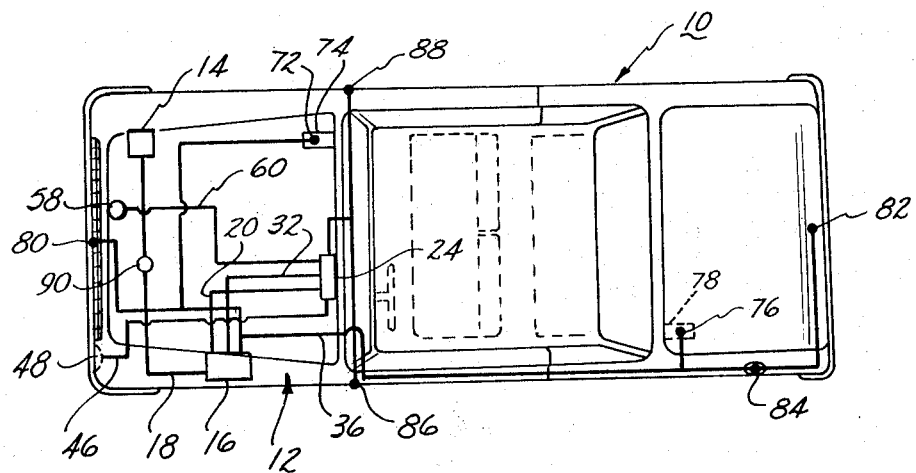
FIG. 2 is a schematic top elevational view of the automobile illustrated in FIG. 1.

Referring now to the drawings and, in particular, to FIGS. 1, 2 and 3 wherein there is illustrated a conventional automobile 10 into which an example of the present invention in the form of an automobile theft prevention alarm system 12 is incorporated, however, it is to be understood by those skilled in the art that the present invention has equal application in trucks, boats, trailers and other self-propelled or towed vehicles and the like. The alarm system 12 which is operatively connected into the electrical system of the automobile 10 comprises a first circuit including the automobile battery 14 connected to an input terminal 15 of a single throw, double pole control switch 16 by electrical wiring 18. The control switch 16 preferably mounted adjacent a fender of the automobile 10 and is activated between an "on" and an "off" position by a key (not shown) insertable through an aperture in the fender and into the control switch 16 as will be explained hereinafter. The output terminal 19 of the control switch 16 is connected by a wire 20 to the power input terminal 22 of a central relay 24. The relay 24 is preferably a modified three pole single throw, eleven pin, normally open relay having a power coil 26, one end of which is connected to the input terminal 22 while the other end is connected to an output terminal 28 which, in turn, is connected to a second input terminal 30 of the control switch 16 by a wire 32. A second output terminal 34 of the control switch 16 is connected by a wire 36 to a plurality of sensing switches 37 which will also be described in greater detail hereinafter. It can thus be seen that when the control switch 16 is in an operative position, that is, in an "on" position, and any one of the sensing switches 37 are activated, the circuit is grounded and the relay 24 will be powered to an activated mode.

The central relay 24 further comprises a terminal 38 electrically connected to an armature or pole 40 of the relay 24. The conventional relay 24 is modified to electrically connect the power input terminal 22 to the pole terminal 38 such that when the relay 24 is actuated, the armature 40 is moved out of contact with a nonconducting terminal 42 and into contact with a terminal 44 which, in turn, is connected by wire 46 to the automobile headlights 48 and thus a complete circuit is made between the battery 14 and the lights 48 to provide one of the operative alarm features of the present invention. The terminal 44 may, if desired, be connected to the flasher lights and interior dome lights of the automobile 10 to provide additional alarm features.

The central relay 24 further comprises a terminal 50 electrically connected to a second armature 52 which is activated by the power coil 26 to move from a non-conducting terminal 54 to conducting terminal 56 which, in turn, is electrically connected to the automobile horn 58 by a wire 60. The central relay 24 is further modified by electrically connecting the terminals 38 and 50 by a wire 62 such that the battery 14 is connected to the horn 58 upon actuation of the relay 24 to provide another operative alarm feature of the present invention.

The central relay 24 has a third armature 64 which is electrically connected to a terminal 66 which, in turn, is connected to the power output terminal 28 of the power coil 26 by a wire 68 which is an added modification of the central relay 24. The armature 64 is normally in contact with a non-conducting terminal 69, however, upon actuation of the power coil 26, the armature 64 is moved into contact with a terminal 70 which is grounded.

It can thus be seen that when the power coil 26 of the central relay 24 is activated by any of the sensing switches 37, the armatures 40 and 52 are shifted to respectively electrically connect the battery 14 to the automobile lights 48 and the horn 58, thereby providing the desired alarm. At the same time, the armature 64 has been shifted into contact with the terminal 70 to ground the system 12 and by-pass the sensing switches 37, and thus even if a would-be thief should reset a sensing switch, such as by closing a door, the alarm system 12 shall continue to function until the owner deactivates the system 12 by means of the control switch 16.

The sensing switches 37, which are preferably mercury type switches, are strategically located about the body of the automobile 10 and are adapted to be actuated when the associated portion of the automobile 10 is used by an unauthorized party after the owner has activated the alarm system 12 by turning the control switch 16 to the "on" position, as aforementioned. The sensing switches 37 are electrically connected to the wire 36 and in a parallel arrangement such that any individual sensing switch is adapted to activate the alarm system 10. In the preferred embodiment, the sensing switches 37 comprise a hood switch 72 attached to the hood hinge assembly 74 and a trunk lid switch 76 attached to the trunk lid hinge assembly 78, each of which becomes operative to ground the relay coil 26 when their associated hinge assemblies are open and the control switch 16 is in the "on" position. The sensing switches 37 may include front and rear bumper switches 80 and 82 which are activated when the automobile 10 is inclined with respect to the horizontal by a predetermned amount as would be the case of the automobile being raised for towing or if one side is raised for the purpose of removing a wheel. A switch 84, associated with the gasoline tank cap, will ground the alarm system 12 in the event tampering with the gas cap should occur. Sensing switches 86 and 88, associated with the existing door light switches, are electrically connected to the relay terminal 66, and thus by-pass the control switch 16 in order to activate the alarm system 12.

It can thus be seen that once the control switch 16 has been set in the "on" position by the owner of the automobile 10, any unauthorized tampering with the automobile 10, such as opening the doors, or the trunk or hood lids, will immediately activate the power coil 26 of the relay 24 and electrically connect the battery to the horn and headlights to activate the same. Since the armature 64 immediately grounds the alarm system 12, the system 12 will continue to sound an alarm until the owner resets the control switch 16 to an "off" position, even in the event the sensing switch should be deactivated by the intruder, such as by closing the hood lid or door.

In the event an unauthorized party should tamper with the automobile 10 and cause one of the sensing switches 37 to activate the alarm system 12, it would be desirable to reset the alarm system 12 after it is in operation a predetermined time period, i.e., 15 minutes, such that the alarm system 12 will not electrically drain the battery 14 to a point where the automobile 10 will not start. For example, if an unauthorized party should open a door and thereby set off the alarm system 12, it is highly probable that such a party would immediately close the door in an attempt to shut off the alarm system 12, however, due to the aforementioned self-grounding aspect of the invention, the alarm system 12 will remain in an activated mode to deter further use or entry into the automobile 10. To prevent the alarm system 12 from continuing to operate after any danger of an unauthorized entry has passed, a time delay switching mechanism 90 is connected in series between the battery 14 and the control switch 16. The time delay switching mechanism 90 is designed to momentarily interrupt the alarm system 12 after a predetermined period of operation after the system 12 has been activated by someone tampering with the automobile 10. If all of the sensing switches are returned to a normal position such as in the aforementioned example, the momentary interruption of the current to the power coil 26 will cause the grounding armature to disengage the terminal 70 and the alarm system will be immediately turned off. Since the control switch 16 is in an "on" position, any furure tampering with the automobile 10 will again activate one of the sensing switches 37 and the alarm will be activated as hereinbefore described. Of course, if one of the sensing switches 37 is in an activated position, e.g., a door is left open by an intruder, when the time delay mechanism 90 momentarily interrupts the circuit, the alarm will continue to function until the owner turns the control switch 16 to an "off" position.

Referring now to FIG. 4, wherein there is illustrated a modification of the present invention in which a conventional eight-pin relay 92 is employed in place of the aforementioned 11-pin relay 24. Similar components of the alarm system 12 which are illustrated in FIG. 4 are identified by the same numerals and are not further described hereinafter. The eight-pin relay 92 is modified by installing a third armature of pole 94 between the terminals 96 and 98 as well as electrically connecting the terminal 96 to the automobile horn 58 and the terminal 98 to the terminal 70. Thus, when the armature 64 is shifted to contact the terminal 70, the system, as well as being grounded, is electrically connected to the horn 58 as the armature 94 is shifted to contact the terminal 96. The control relay 92 thus functions in the same manner as the relay 24 hereinbefore described.

Referring now to FIG. 5, there is illustrated another modification of the present invention in the form of an ignition control system 100 comprising a manually operated switch 102 normally mounted on the dashboard of the automobile 10 and which is electrically connected to the ignition coil 104 of the automobile power source, such as a conventional internal combustion engine. A second switch 106 is electrically connected in series with the manually operated switch 102 and is adapted to ground the ignition coil 104 when both switches 102 and 106 are closed. In operation, the switch 106 is operated by the transmission control lever and when the same is in a neutral or parked position the switch 106 is opened and has no effect on engine operation, however, the switch 106 is designed to be closed in the event the transmission lever is moved to either a forward or reverse position. Thus, the driver of a vehicle, simply by placing the transmission lever in a neutral or parked position and by manually actuating the switch 102, is provided with a theft prevention device since the engine coil 104 will be immediately grounded if an unauthorized party attempts to shift the transmission lever to a forward or reverse position as such action will close switch 106 and ground the engine coil 104. It can be appreciated that the ignition control system 100 has equal application on a standard or manually operated transmission as well as a conventional automatic transmission.

While several embodiments of the present invention have been disclosed, it is to be understood by those skilled in the field of automobile theft prevention alarm systems that other forms can be adopted, all coming within the spirit of the invention and scope of the appended claims.

What is claimed is as follows:

1. An alarm system for indicating the unauthorized use of an automobile of the type having an engine, a battery operated ignition system, externally mounted driving lights, a horn and electrically operated switching means for selectively connecting the battery to the lights and horn, said alarm system comprising:

an externally mounted switching means operable to activate said alarm system;

an electromagnetic relay electrically connected to said external switch;

a plurality of sensing switches electrically connected in parallel, each associated with a selected portion of said vehicle and adapted to become operative when their associated vehicle portion is used, while said externally mounted switching means is operable;

a first circuit comprising said automobile battery connected in series with the power input of said relay through said externally mounted switching means when the same is operable, said relay having a power output electrically connected to said sensing switches such that said relay becomes activated when one of said sensing switches becomes operable; and said activated relay forming a second circuit connecting said battery with said automobile lights and horn, said relay remaining in said actuated state irrespective of the operating mode of said sensing switches, after said relay has been activated by one of said sensing switches, said relay comprising a power coil having a power input and a power output respectively electrically connected in series through said externally mounted switch to said battery and said sensing switches such that said power output end of said coil is grounded when one of said sensing switches is closed, said relay having first and second armatures, each connected to said power input end of said relay and respectively electrically connected to said lights and horn when one of said sensing switches is closed to ground said power coil, a third armature of said relay being electrically connected to said power output end of said coil and adapted to ground same when said coil is activated by said sensing switches, such that said relay remains activated irrespective of the operating modes of said sensing switches.

2. The alarm system defined in claim 1, further comprising second sensing switches operable upon opening of the doors of said automobile, said second sensing switches being connected directly to said power output end of said relay coil and adapted to activate said relay upon opening of one of said doors when said switching means is operable, said alarm system remaining activated after said doors are closed.

3. An alarm system for indicating the unauthorized use of an automobile of the type having an engine, a battery operated ignition system, externally mounted driving lights, a horn and electrically operated switching means for selectively connecting the battery to the lights and horn, said alarm system comprising:

an externally mounted switching means operable to activate said alarm system;

an electromagnetic relay electrically connected to said external switch;

a plurality of sensing switches electrically connected in parallel, each associated with a selected portion of said vehicle and adapted to become operative when their associated vehicle portion is used, while said externally mounted switching means is operable;

a first circuit comprising said automobile battery connected in series with the power input of said relay through said externally mounted switching means when the same is operable, said relay having a power output electrically connected to said sensing switches such that said relay becomes activated when one of said sensing switches becomes operable;

said activated relay forming a second circuit connecting said battery with said automobile lights and horn, said relay remaining in said actuated state irrespective of the operating mode of said sensing switches, after said relay has been activated by one of said sensing switches; and first and second switching means connected in series with the ignition coil of said ignition system and adapted to ground said ignition coil when said first and second switching means are operable, said first switching means being manually operated by the vehicle operator, said second switching means being operated by the shifting mechanism of said automobile and being inoperative in a neutral position and operative in a non-neutral position.

4. The alarm system defined in claim 3, further comprising a time delay switch electrically connected in series in said first circuit and adapted to momentarily electrically disconnect said relay and said battery after a predetermined time after said relay is initially activated by one of said sensing means, said relay remaining in a de-activated state if said sensing switches are inoperative after said time delay switch momentarily disconnects said relay and said battery.

5. The alarm system defined in claim 1, further comprising a time delay switch electrically connected in series with said power input of said coil in said first circuit and adapted to momentarily electrically disconnect said relay coil and said battery after a predetermined time after said coil is activated by the closing of one of said sensing switches, said relay remaining in a de-activated state if said sensing switches are open.

6. The alarm system defined in claim 1, wherein said sensing switches comprise a plurality of mercury switches adapted to close said first circuit and activate said relay, said mercury switches being associated with the automobile doors, trunk lid, motor hood and becoming operable when said automobile portions are opened.

7. The alarm system defined in claim 6 wherein mercury switches are associated with portions of the automobile and are activated when the automobile is inclined beyond a predetermined amount.

* * * * *